US009964992B2

(12) United States Patent
Tarnoff (10) Patent No.: US 9,964,992 B2
(45) Date of Patent: May 8, 2018

(54) COMPUTER DOCKING STATION

(71) Applicant: GAMBER-JOHNSON LLC, Stevens Point, WI (US)

(72) Inventor: Matthew S. Tarnoff, Stevens Point, WI (US)

(73) Assignee: Gamber-Johnson LLC, Stevens Point, WI (US)

( * ) Notice: Subject to any disclaimer, the term of this patent is extended or adjusted under 35 U.S.C. 154(b) by 0 days. days.

(21) Appl. No.: 15/471,820

(22) Filed: Mar. 28, 2017

(65) Prior Publication Data

US 2017/0199545 A1     Jul. 13, 2017

Related U.S. Application Data

(63) Continuation of application No. 13/570,425, filed on Aug. 9, 2012, now Pat. No. 9,612,616, which is a continuation of application No. 13/025,430, filed on Feb. 11, 2011, now Pat. No. 8,315,048, which is a continuation of application No. 12/570,744, filed on Sep. 30, 2009, now Pat. No. 7,911,779.

(51) Int. Cl.
| | |
|---|---|
| *H05K 7/00* | (2006.01) |
| *H05K 5/00* | (2006.01) |
| *G06F 1/16* | (2006.01) |

(52) U.S. Cl.
CPC ................. *G06F 1/1632* (2013.01)

(58) Field of Classification Search
CPC .................................................... G06F 1/1263
USPC .................................................... 361/679.21
See application file for complete search history.

(56) References Cited

U.S. PATENT DOCUMENTS

| | | | |
|---|---|---|---|
| 5,633,782 | A | 5/1997 | Goodman et al. |
| 5,751,546 | A | 5/1998 | Clark et al. |
| 5,790,375 | A | 8/1998 | Lee |
| 5,867,774 | A | 2/1999 | Summers et al. |
| 6,042,414 | A | 3/2000 | Kunert |
| 6,053,759 | A | 4/2000 | Kunert |
| 6,069,790 | A | 5/2000 | Howell et al. |

(Continued)

OTHER PUBLICATIONS

Gamber Johnson, Dell D600/D610 Docking Cradles, features sheet, undated, 1 page.

(Continued)

*Primary Examiner* — Jerry Wu
(74) *Attorney, Agent, or Firm* — Michael Best & Friedrich LLP (57) ABSTRACT

A computer docking station for supporting a portable computer includes a body with a cradle portion configured to support a portion of the portable computer, and an arm portion spaced from the cradle portion. A latching member is coupled with the arm portion and movable between a first position relative to the arm portion, in which the portable computer can be removed from the docking station, and a second position relative to the arm portion, in which the portable computer cannot be removed from the docking station. The computer moves the latching member from the second position to the first position, in a direction toward the cradle portion, as the computer is inserted into the docking station and the latching member automatically moves from the first position to the second position, in a direction away from the cradle portion, as the computer is fully inserted into the docking station.

20 Claims, 7 Drawing Sheets

(56) References Cited

U.S. PATENT DOCUMENTS

| | | | |
|---|---|---|---|
| 6,101,087 | A | 8/2000 | Sutton et al. |
| 6,229,893 | B1 | 5/2001 | Chen |
| 6,264,488 | B1 | 7/2001 | Helot et al. |
| 6,520,466 | B1 | 2/2003 | Blanchard, III et al. |
| 6,532,152 | B1 | 3/2003 | White et al. |
| 6,549,416 | B2 | 4/2003 | Sterner et al. |
| 6,585,212 | B2 | 7/2003 | Carnevali |
| 6,647,248 | B1 | 11/2003 | Ortscheid et al. |
| 6,785,567 | B2 | 8/2004 | Kato |
| 7,017,243 | B2 | 3/2006 | Carnevali |
| 7,052,296 | B2 | 5/2006 | Yang et al. |
| 7,180,753 | B2 | 2/2007 | Kerrigan et al. |
| 7,273,203 | B2 | 9/2007 | Carnevali |
| 7,274,564 | B2 | 9/2007 | Rossini |
| D585,897 | S | 2/2009 | Carnevali |
| 8,179,672 | B2 | 5/2012 | Carnevali |
| 8,182,426 | B2 | 5/2012 | Zhao et al. |
| 2003/0083115 | A1* | 5/2003 | Kato .................... H04B 1/3877 455/573 |
| 2003/0174855 | A1 | 9/2003 | Hawkins et al. |
| 2007/0127204 | A1 | 6/2007 | Muenzer et al. |
| 2007/0190843 | A1 | 8/2007 | Snow et al. |
| 2008/0239658 | A1 | 10/2008 | Chou et al. |
| 2008/0270664 | A1 | 10/2008 | Carnevali |
| 2009/0045234 | A1 | 2/2009 | Carnevali |
| 2009/0140113 | A1 | 6/2009 | Carnevali |
| 2009/0179435 | A1 | 7/2009 | Lev et al. |
| 2009/0201636 | A1 | 8/2009 | Doherty et al. |
| 2009/0213536 | A1 | 8/2009 | Lewandowski et al. |
| 2011/0095159 | A1 | 4/2011 | Carnevali |
| 2011/0266230 | A1 | 11/2011 | Carnevali |
| 2012/0045931 | A1 | 2/2012 | Carnevali |
| 2012/0045932 | A1 | 2/2012 | Carnevali |

OTHER PUBLICATIONS

RAM Mounts, UNPKD Passive RAM Cradle Motion C5, part details webpage, printed Aug. 24, 2009 from http://www.ram-mount.com/CatalogResults/PartDetails/tabid/63/partid/082065077045072 . . . , 1 page.

RAM Mounts, RAM Mount for Motion C5, part details webpage, printed Jul. 29, 2009 from http://www.ram-mount.com/CatalogResults/PartDetails/tabid/63/partid/082065077045049 . . . , 1 page.

RAM Mounts, RAM Dbl Suction Mount for Motion C5, part details webpage, printed Jul. 29, 2009 from http://www.ram-mount.com/CatalogResults/PartDetails/tabid/63/partid/082065077045049 . . . , 1 page.

RAM Mounts, RAM Aircraft Seat Rail Sys Motion LS800, part details webpage, printed Jul. 29, 2009 from http://www.ram-mount.com/CatalogResults/PartDetails/tabid/63/partid/0820650770-45049 . . . , 1 page.

RAM Mounts, RAM Mounts for the Panasonic Toughbook CF-H1, product webpages, undated, 2 pages.

Rugged PC review.com, RAM Mounts for Panasonic Toughbook CF-H1, product webpages, undated, 2 pages.

Rugged PC review.com, Panasonic Toughbook H1, product webpages, undated, 11 pages.

* cited by examiner

COMPUTER DOCKING STATION

RELATED APPLICATIONS

This application is a continuation of U.S. patent application Ser. No. 13/570,425 filed Aug. 9, 2012, which is a continuation of U.S. patent application Ser. No. 13/025,430 filed Feb. 11, 2011, now U.S. Pat. No. 8,315,048, which is a continuation of U.S. patent application Ser. No. 12/570,744 filed Sep. 30, 2009, now U.S. Pat. No. 7,911,779. The entire content of these prior applications is hereby incorporated by reference herein.

BACKGROUND

The present invention relates to computer docking stations.

Portable, tablet-style computers are known for use in various industries (e.g. the medical industry). Such tablet-style computers commonly include an integral carrying handle formed at least in part by an aperture in the body of the computer.

SUMMARY

In one aspect, the invention provides a computer docking station for supporting a portable computer. The docking station includes a body having a cradle portion configured to support a first portion of the portable computer and an arm portion spaced from the cradle portion. A latching member is coupled with the body adjacent to the arm portion. The latching member is movable relative to the arm portion between a first position, in which the portable computer can be inserted into or removed from the docking station, and a second position, in which the portable computer cannot be removed from the docking station when the portable computer is fully inserted into the docking station. The portable computer moves the latching member from the second position to the first position, in a direction toward the cradle portion, as the portable computer is inserted into the docking station, and the latching member automatically moves from the first position to the second position, in a direction away from the cradle portion, as the portable computer moves past and clears the latching member as the portable computer is fully inserted into the docking station.

In another aspect, the invention provides a computer docking station for supporting and electrically coupling to a portable computer that includes a docking connector. The docking station includes a body having a cradle portion configured to support a portion of the portable computer and having a connector operable to electrically couple with the docking connector of the portable computer. The body further includes an arm portion spaced from the cradle portion. The arm portion does not translate with respect to the cradle portion. A latching member is coupled with the arm portion and movable between a first, retracted position within the arm portion, in which the portable computer can be removed from the docking station, and a second, extended position from the arm portion, in which the portable computer cannot be removed from the docking station. The latching member automatically moves from the second position to the first position as the portable computer is inserted into the docking station, and automatically moves from the first position to the second position after the portable computer is fully inserted into and electrically coupled to the docking station. The latching member includes a cam surface engageable by the portable computer as the portable computer is being inserted into the docking station to automatically move the latching member from the second position to the first position.

In yet another aspect, the invention provides a computer docking station for supporting a portable computer having a first side that includes a display. The docking station includes a body having a cradle portion configured to support a first portion of the portable computer and an arm portion spaced from the cradle portion. The arm portion does not translate with respect to the cradle portion. A latching member is coupled with the body adjacent to the arm portion. The latching member is movable relative to the arm portion between a first position, in which the portable computer can be inserted into or removed from the docking station, and a second position, in which the portable computer cannot be removed from the docking station when the portable computer is fully inserted into the docking station. The portable computer moves the latching member from the second position to the first position as the portable computer is inserted into the docking station and the latching member automatically moves from the first position to the second position as the portable computer moves past and clears the latching member as the portable computer is fully inserted into the docking station. The latching member is positioned relative to the body so that when in the second position, the latching member engages a portion of a surface of the portable computer that is on the first side so that at least a portion of the latching member is exposed to view by a user of the portable computer when the portable computer is fully inserted into the docking station. The latching member includes an activation portion that is accessible to a user to manually move the latching member to the first position. The docking station further includes a lock mechanism operable to selectively lock the latching member in the second position, exposed to view by a user of the portable computer, when the portable computer is fully inserted into the docking station.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
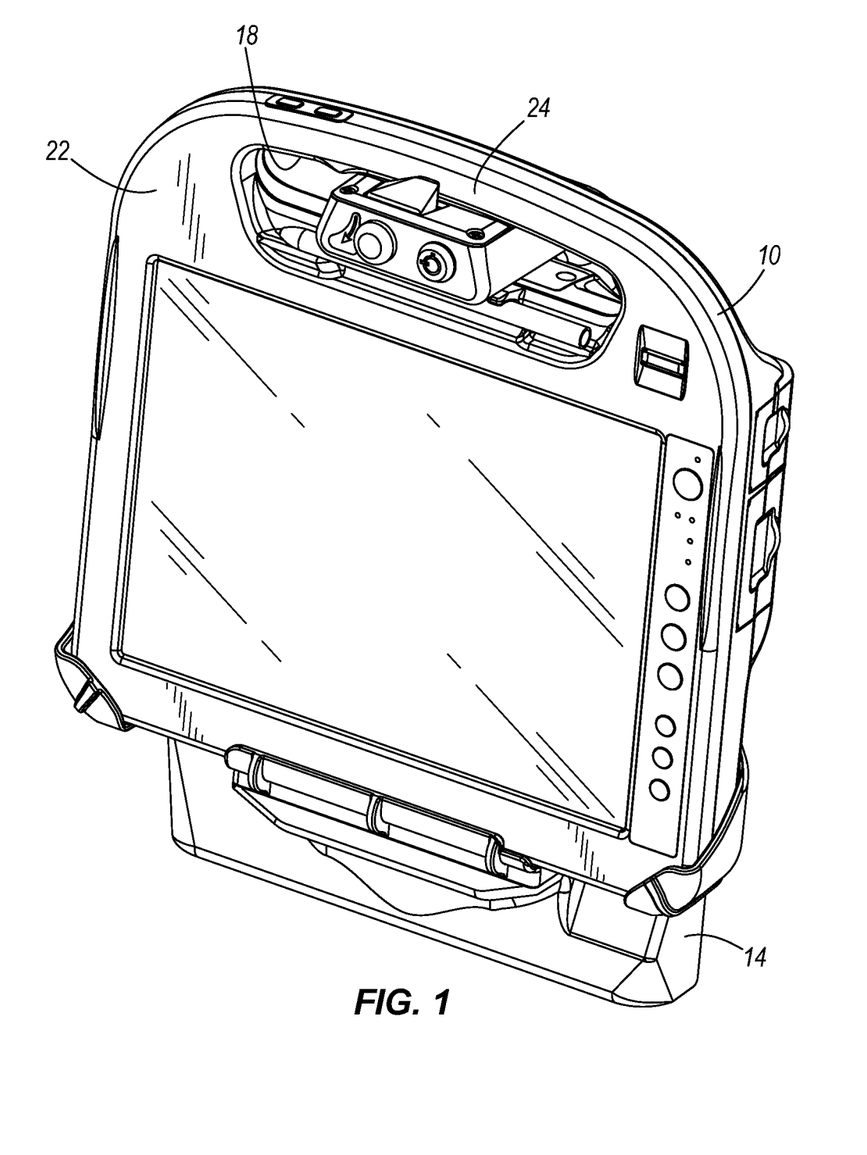
FIG. 1 is a perspective view showing a portable computer docked in a computer docking station embodying the invention.

FIG. 1 illustrates a portable computer 10 docked in a docking station 14 of the present invention. The illustrated portable computer 10 is a tablet-style portable computer having an aperture 18 formed in and/or through the body 22 of the computer 10 to at least partially define a carrying handle 24 of the computer 10. One example of such a portable tablet-style computer 10 is the Panasonic Toughbook CF-H1 computer.

The docking station 14 is operable to support and electrically couple to the computer 10 when the computer 10 is not being carried by hand. The docking station 14 can be mounted virtually anywhere the computer might be used, including in a room or in a vehicle. Additionally, the docking station 14 can be mounted on a movable cart, desk, or the like to render the computer 10 mobile even when docked in the docking station 14. Various mounting hardware (not shown) can be used to secure the docking station 14 in the appropriate manner to a support surface. The illustrated docking station 14 is configured to have a shape that is form-fitting to the computer 10 such that very little of the docking station 14 can be seen when the computer 10 is docked with the docking station 14.

Figure 2:
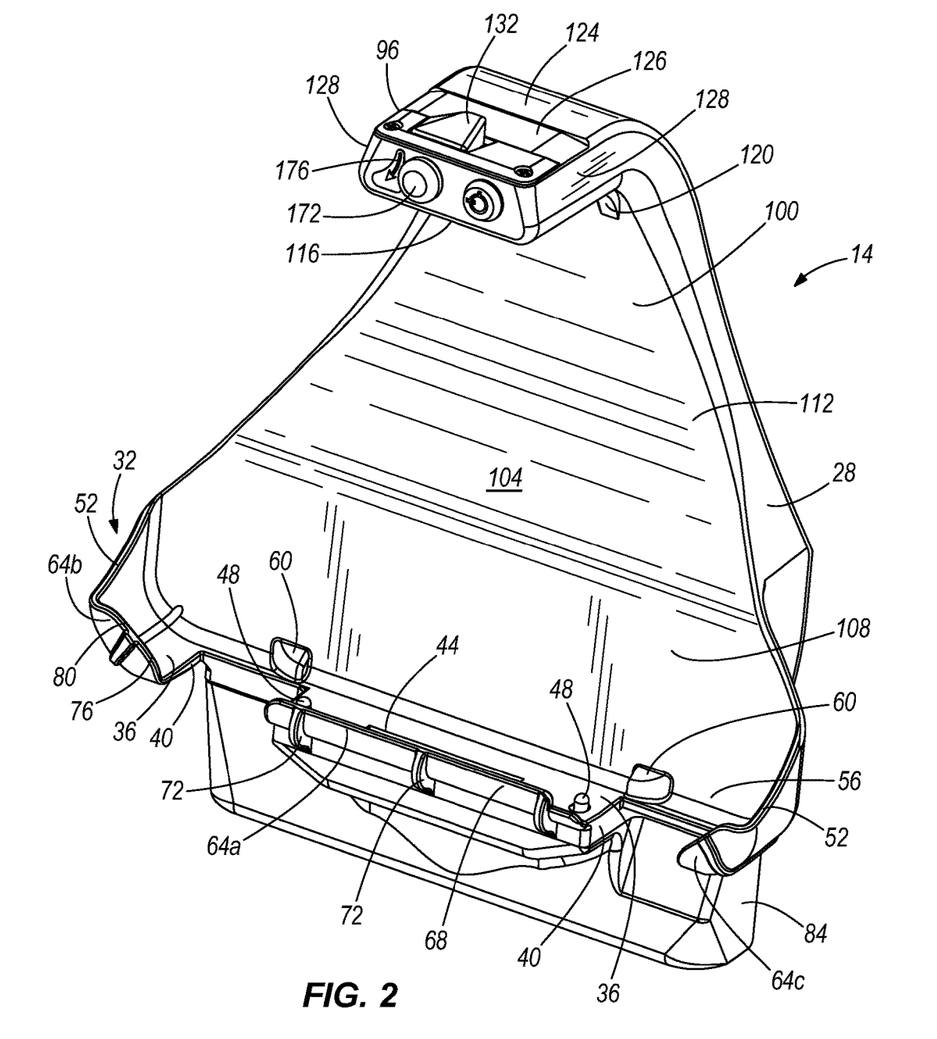
FIG. 2 is a perspective view of the computer docking station embodying the invention.
Figure 3:
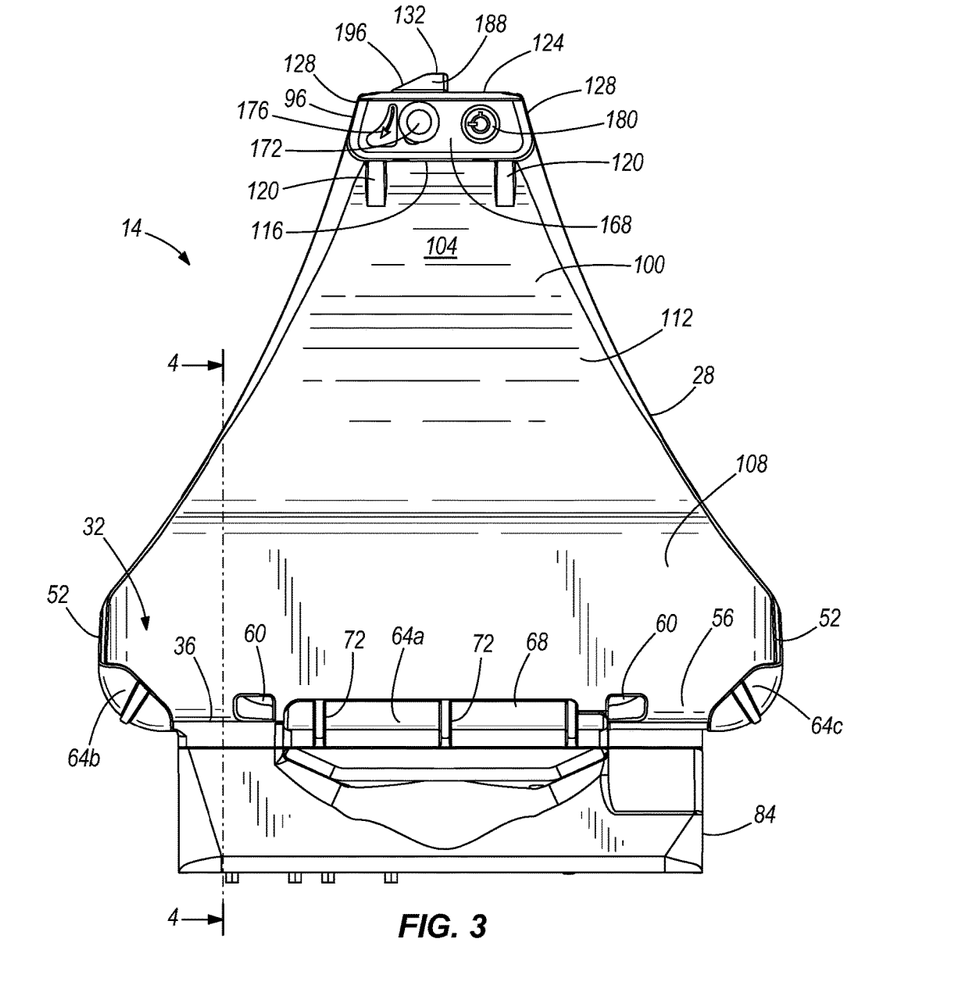
FIG. 3 is a front view of the computer docking station of FIG. 2.
Figure 6:
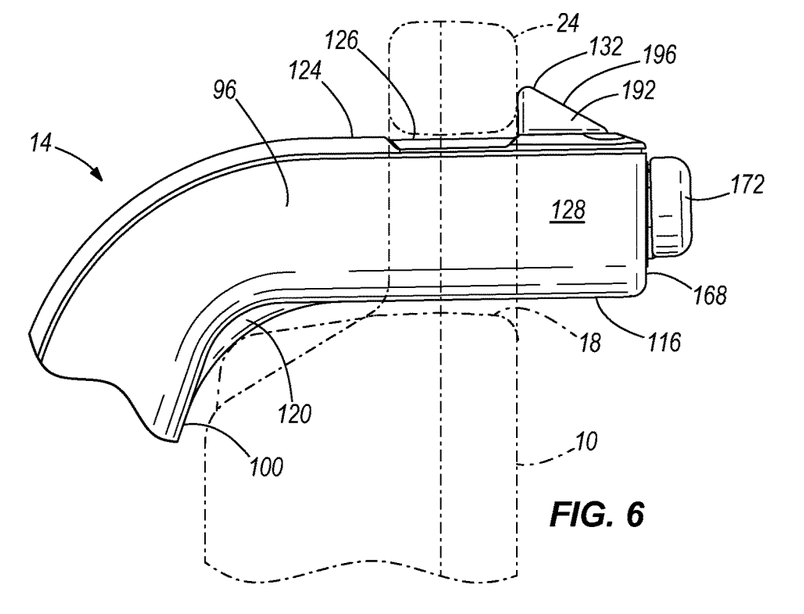
FIG. 6 is an enlarged partial view of the arm portion of the docking station of FIG. 2 shown with the latching member in a second position.
Figure 7:
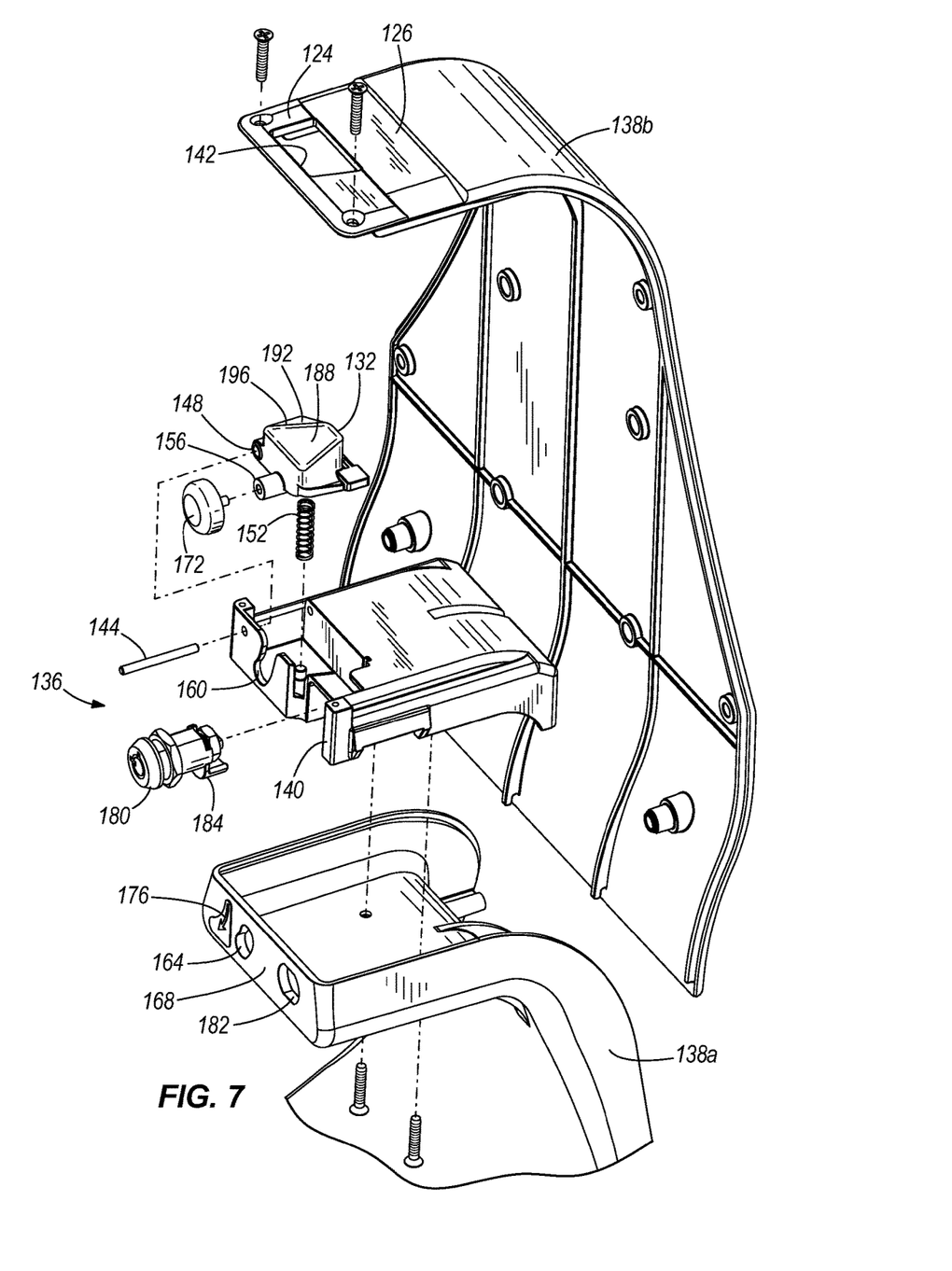
FIG. 7 is an exploded view showing the latching assembly and lock mechanism.
Figure 8:
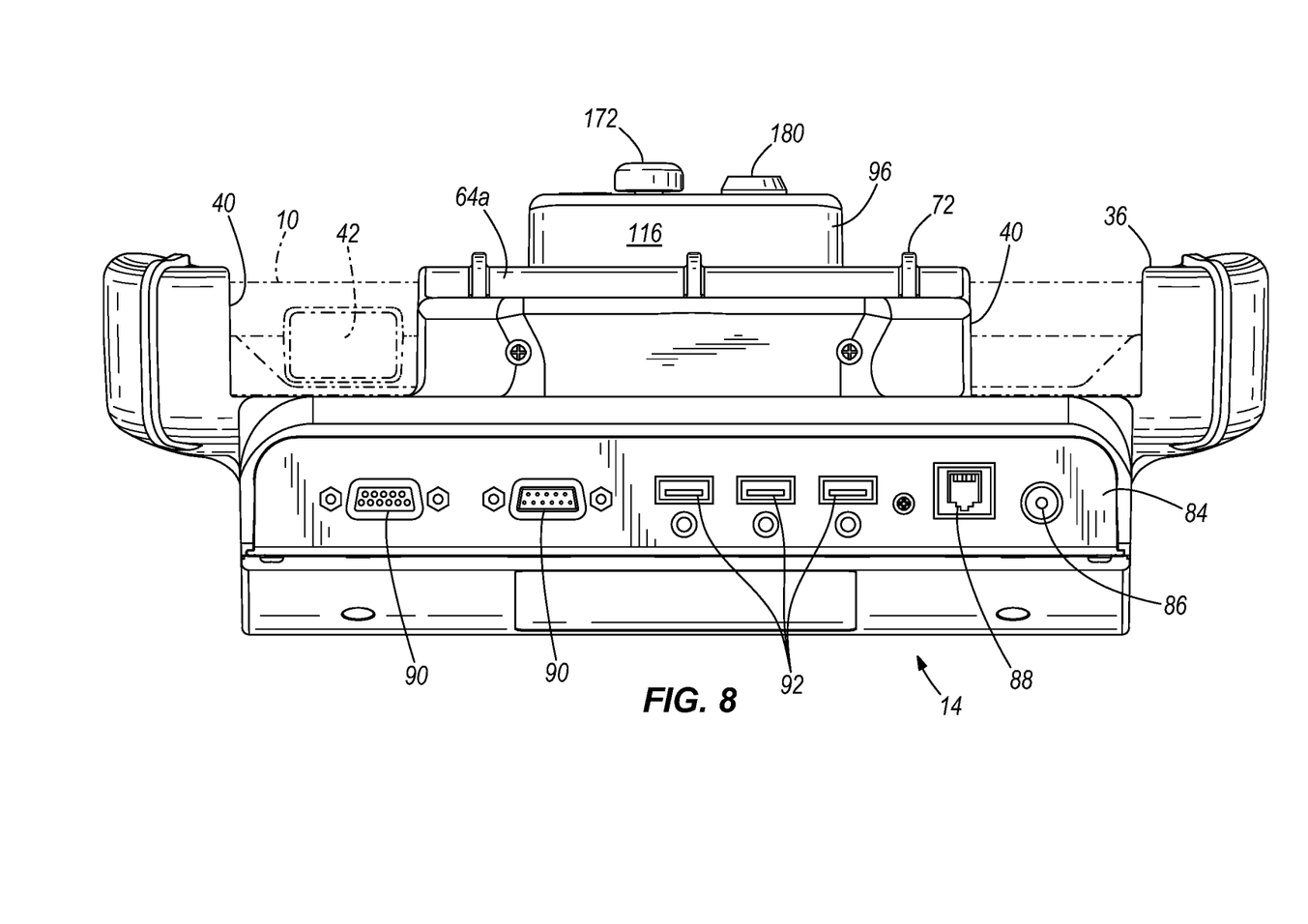
FIG. 8 is a bottom view of the computer docking station of FIG. 2.

Referring now to FIGS. 2-8, the docking station 14 includes a body 28 that is primarily plastic (e.g., polycarbonate resin), but in other embodiments could be primarily metal or other suitable materials. The illustrated docking station 14 also includes some nylon parts, steel brackets, electrical components, and steel hardware. The body 28 includes a cradle portion 32 configured to support a portion of the computer 10, and in the illustrated embodiment supports a bottom or lower portion of the computer. As used herein and in the appended claims, the terms "upper", "lower", "top", "bottom", "front", "back", and other directional terms are not intended to require any particular orientation, but are instead used for purposes of description only. The cradle portion 32 includes a base wall 36 sized and configured to engage and support the lower edge of the computer 10. As best shown in FIGS. 2 and 8, the base wall 36 includes one or more breaks or apertures 40 formed therein. The apertures 40 can provide access to the supported lower edge of the computer 10 when the computer is supported in the docking station 14. As shown in FIG. 8, one aperture 40 provides access to a barcode scanning lens 42, but can also allow a user to make electrical connections to electrical ports, connectors, and the like found in the lower edge of the computer 10. Furthermore, the apertures 40 can additionally, or alternatively be operable to provide an alignment feature for mating with alignment features on the lower edge of the computer 10. Yet additionally, the apertures 40, by virtue of the removed material, can provide some resiliency or flexibility to the cradle portion 32 to facilitate insertion and removal of the computer 10 from the docking station 14. It is to be understood that the number, location, and configuration of the apertures 40 can vary as desired, and perhaps based on the particular computer 10 to be docked.

In the illustrated embodiment, the base wall 36 also supports a connector 44 (see FIG. 2) sized and configured to electrically couple with a mating docking connector (not shown) on the computer 10. The electrical coupling of computers and docking stations using connectors 44 and the mating docking connectors on computers is well known, and will not be described further. Grounding pins 48 also extend from the base wall 36 on opposite sides of the connector 44 to ground the computer 10 when it is docked in the docking station 14.

The base wall 36 transitions into opposing, generally parallel side walls 52 that further define the cradle portion 32 and engage oppositely-facing edges of the computer 10. In the illustrated embodiment, the base wall 36 and each side wall 52, along with the transitions therebetween are sized and configured to engage and support lower edge corners of the computer 10.

The cradle portion 32 is also partly defined by a rear wall 56 intersecting the base wall 36 to engage and support a lower rear surface of the computer 10 when it is positioned in the cradle portion 32. The illustrated rear wall 56 includes one or more alignment projections 60 sized, configured, and positioned to align with recesses (not shown) in the rear surface of the computer 10. The alignment projections 60 help to obtain an aligned, snug fit of the computer 10 within the cradle portion 32.

Figure 4:
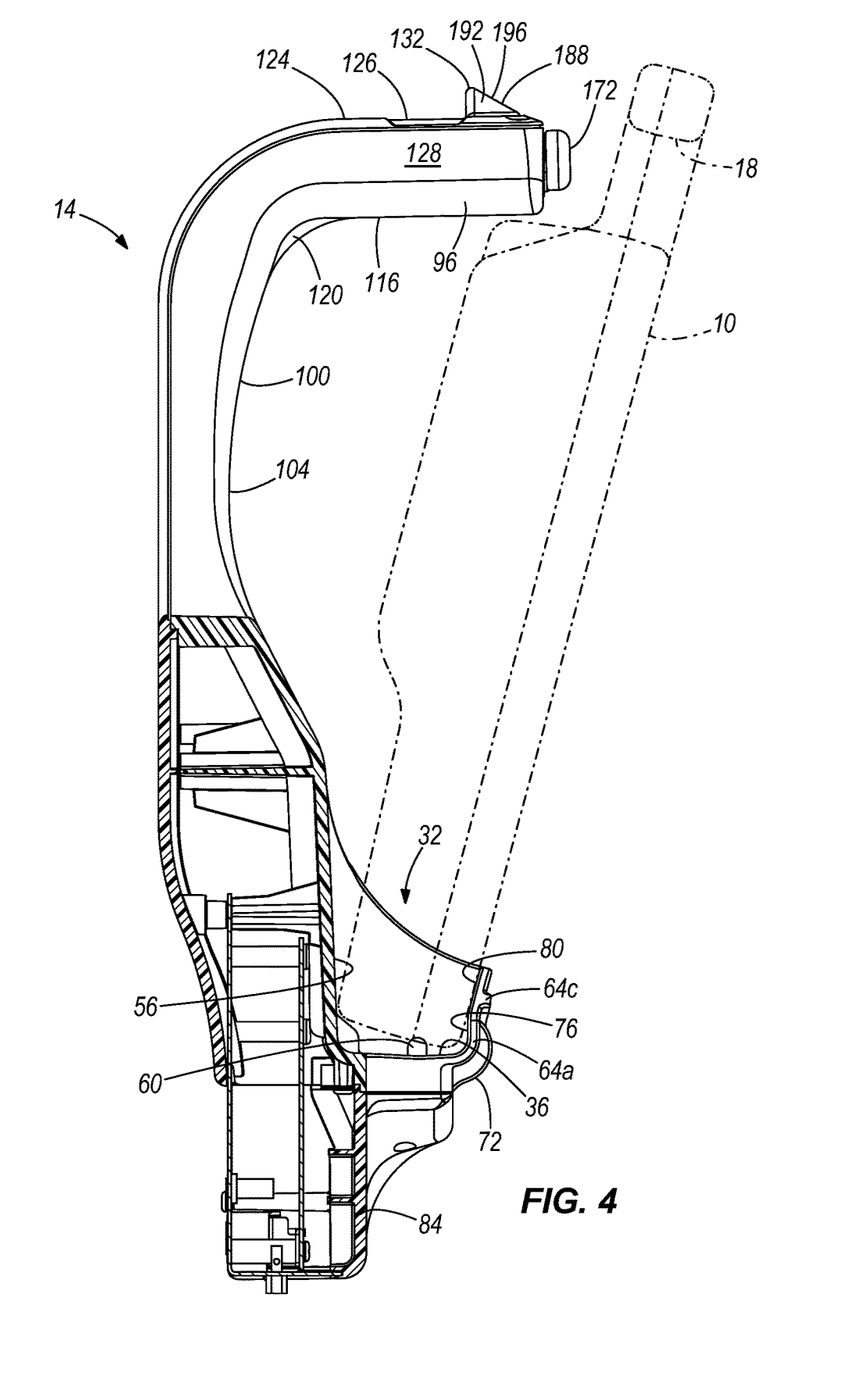
FIG. 4 is a section view of the computer docking station taken along line 4-4 of FIG. 3.
Figure 5:
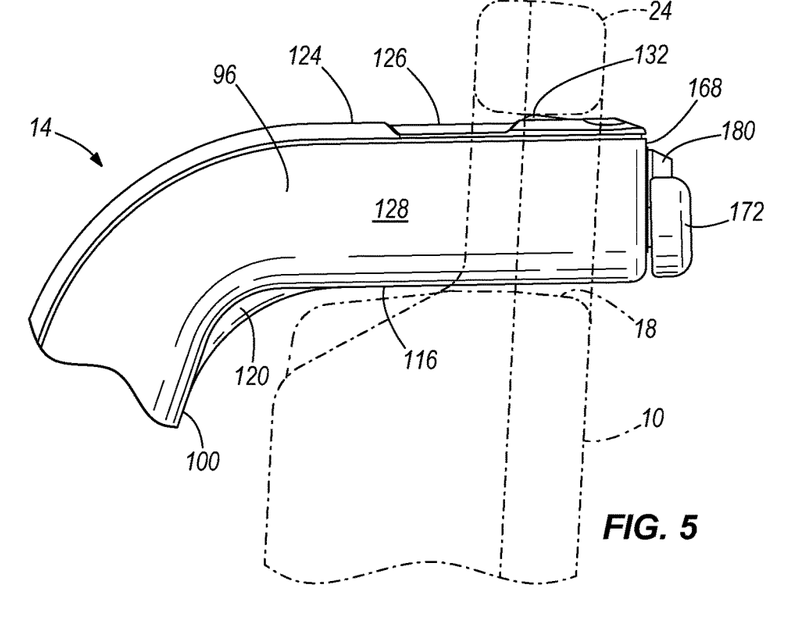
FIG. 5 is an enlarged partial view of the arm portion of the docking station of FIG. 2 shown with a latching member in a first position.

The cradle portion 32 further includes at least one flange extending from the base wall 36 to engage and support a front surface of the computer 10 when it is positioned in the cradle portion 32, thereby securing the lower portion of the computer 10 within the cradle portion 32. The illustrated embodiment includes three flanges 64a, b, and c. The flange 64a extends from a central portion of the base wall 36 and has a flange portion 68 that extends in a direction generally normal to the base wall 36. One or more strengthening ribs 72 can be formed on an outer surface of the flange portion 68 to provide the desired strength and rigidity to the flange 64a. Flanges 64b and 64c extend from opposite distal ends of the base wall 36 and are coupled with the respective side walls 52. As best shown in FIG. 4, each flange 64b, 64c includes a first flange portion 76 that extends in a direction generally normal to the base wall 36, and a second flange portion 80 that extends in a direction oblique to the base wall 36 to facilitate insertion of the computer 10 into the cradle portion. FIG. 4 illustrates the computer 10 in phantom lines angled relative to base wall 36 as dictated by the engagement of the front surface of the computer 10 with the second flange portions 80. Therefore, the second flange portions 80 act as a lead-in or guiding surface during insertion of the computer 10 into the docking station 14. The cradle portion 32 acts as a pivot point for the computer 10 during the docking process.

A connection module 84 is coupled with the cradle portion 32. As best shown in FIG. 8, the connection module 84 includes electrical connections (e.g., a power connection 86, a network or phone connection 88, standard pin connections 90 for monitors, printers, and the like, and USB ports 92). The various electrical connections are electrically coupled to the computer through the connector 44, as is well known.

The body 28 of the docking station 14 further includes an arm portion 96 sized and configured to be received in the aperture 18 in the computer 10. In the illustrated embodiment, the arm portion 96 extends entirely through the aperture 18, however in other embodiments, the arm portion 18 need not extend entirely through the aperture 18, but could instead extend into the aperture 18 without extending all the way through and back out of the aperture 18.

A transition portion 100 of the body 28 extends between the arm portion 96 and the cradle portion 32. In the illustrated embodiment, the transition portion 100 has a front surface 104 that smoothly transitions the rear wall 56 of the cradle portion 32 into the arm portion 96 without any seams, parting lines, or other discontinuities that might collect dirt or debris. The front surface 104 of the illustrated transition portion 100 has a portion 108 that is generally co-planar with the rear wall 56 of the cradle portion 32, and a portion 112 that is curved or contoured to generally conform to and receive the rear surface of the computer 10 (e.g., the rear surface itself or an integral handle strap assembly extending from the rear surface).

The arm portion 96 includes a bottom surface 116, which can include one or more ribs 120 extending to the front surface 104 of the transition portion 100. The ribs 120 are engageable with the rear surface of the computer 10 (see FIG. 6) to help guide the arm portion 96 into the aperture 18 of the computer 10. The ribs 120 can also provide strength and rigidity to the arm portion 96, which can resiliently deflect somewhat relative to the transition portion 100 during insertion of the arm portion 96 into the aperture 18 of the computer 10. The bottom surface 116, and the arm portion 96 in general, are oriented to be generally parallel with the base wall 36 of the cradle portion 32. In other words, the arm portion 96 extends from a remainder of the body 28 in a direction generally parallel to the base wall 36, so as to be received in and extend through the aperture 18, which extends through the body 22 of the computer 10 in a direction generally normal to the front surface of the computer 10.

The arm portion 96 also includes a top surface 124 spaced from and generally parallel to the bottom surface 116. The top surface 124 and bottom surface 116 are spaced apart by a distance slightly smaller than a height of the aperture 18. The illustrated top surface 124 includes a recess 126 sized and configured to receive the handle 24 of the computer 10 when the computer 10 is docked in the docking station 14. Opposite side surfaces 128 of the arm portion 96 extend between the top and bottom surfaces 124, 116.

A latching member 132 is coupled with the arm portion 96 and is movable between a first position relative to the arm portion 96, in which the arm portion 96 can be inserted into or removed from the aperture 18 (see FIG. 5), and a second position relative to the arm portion 96, in which the arm portion 96 cannot be removed from the aperture 18 (see FIGS. 1-4 and 6). In the illustrated embodiment, the latching member 132 is retracted relative to and into the arm portion 96 when in the first position, and is extended relative to and from the arm portion 96 when in the second position. While the latching member 132 is illustrated as being positioned on the top surface 124 of the arm portion, the latching member 132 can alternatively be positioned on the bottom surface 116 or on the side surfaces 128 of the arm portion 96 to engage different portions of the aperture 18.

Referring to FIG. 7, the latching member 132 is part of a latching assembly 136 coupled with the arm portion 96. In the illustrated embodiment, the latching assembly 136 is sandwiched between a front housing portion 138a and a rear housing portion 138b that together define part of the docking station 14. A base 140 of the latching assembly 136 is housed within the arm portion 96 and supports the latching member 132 in a manner that permits the latching member 132 to move between the first and second positions within an aperture 142 formed in the top surface 124. Specifically, the latching member 132 is pivotally connected to the base 140 via a pin 144 received through a tubular portion 148 of the latching member 132. The pin 144 is supported at its ends by the base 140. A biasing member in the form of a compression spring 152 biases the latching member 132 relative to the base 140 and the arm portion 96 to the second, or extended position.

A projection 156 extends from the latching member 132 through a slot 160 in the base 140 and into a corresponding slot 164 in a front surface 168 of the arm portion 96. An activation member 172 is coupled to the projection 156 and is accessible to a user to manually move the latching member 132 to the first position. The illustrated activation member 172 is a generally disk-shaped part that can be manually pressed in a direction downwardly and to the left (as indicated by the indicia arrow 176) to move the latching member 132 from the second position to the first position, against the bias of the spring 152. In other embodiments, the activation member 172 can simply be the end of the projection 156. It is to be understood that the illustrated latching assembly 136 is just one possible configuration that can be used with the docking station 14. Other latching assemblies capable of providing a latching member movable between two positions (i.e., latched and unlatched) relative to the arm portion 96 can be substituted.

The illustrated latching assembly 136 further includes an optional lock mechanism 180 operable to selectively lock the latching member 132 in the second, or extended position. When the computer 10 is docked in the docking station 14 and the lock mechanism 180 locks the latching member 132 in the extended position, the computer 10 cannot be removed from the docking station 14 because the arm portion 96 cannot be removed from within the aperture 18. The lock mechanism 180 is at least partially received in the arm portion 96 (via aperture 182 in the front surface 168), and in the illustrated embodiment is operated with a key to rotate a cam 184. When the lock mechanism 180 is engaged (i.e., locked) to lock the latching member 132 in the second position, the cam 184 prevents the latching member 132 from moving to the first position, retracted within the arm portion 96. When the lock mechanism 180 is not engaged (i.e., unlocked), the latching member 132 is free to retract into the base 140 and into the arm portion 96. Other lock mechanisms can be substituted for the illustrated key-activated lock mechanism.

The latching member 132 is configured such that it can automatically move from the second, extended position, to the first, retracted position as the arm portion 96 is being inserted into the aperture 18. The illustrated latching member 132 includes two oblique cam surfaces 188, 192 that intersect to define a cam surface edge 196. The first cam surface 188 slopes upwardly and rearwardly relative to the front surface 168 of the arm portion 96. The second cam surface 192 slopes upwardly and left-to-right relative to the front surface 168 of the arm portion 96. Therefore, the intersection of the two cam surfaces 188 and 192 define the cam surface edge 196 that slopes upwardly, rearwardly, and left-to-right relative to the front surface 168 of the arm portion 96. As the arm portion 96 is inserted into the aperture 18 of the computer 10 during docking, the upper inner surface of the computer defining the aperture 18 engages the two cam surfaces 188, 192 and the cam surface edge 196 and automatically moves the latching member 132 from the second, extended position to the first, retracted position as the arm portion 96 is inserted into the aperture 18 (see FIG. 5).

Once the arm portion 96 is fully inserted through the aperture 18, the latching member 132, under the biasing force of the spring 152, automatically moves from the first, retracted position, back to the second, extended position to secure the computer 10 in the docking station 14 (see FIG. 6). An audible "click" will be heard to confirm the latching mechanism 132 has returned to the second, extended position. The lock mechanism 180 can then be locked to prevent the computer 10 from being removed.

To remove the computer 10 from the docking station 14, the user can unlock the lock mechanism 180 if it had been locked. Next, the user manually moves the activation member 172 in the direction illustrated in the indicia arrow 176 so that the latching mechanism 132 moves to the second, retracted position, thereby allowing the user to pivot the top of the computer 10 away from the arm portion 96 to remove the arm portion 96 from the aperture 18. The undocking and removal of the computer 10 can be done with a single hand, whereby the user grabs the handle 24 as if picking the computer 10 up off a table. The user's thumb will be generally aligned with the activation member 172 so that the activation member 172 can be intuitively pressed by the user's thumb, and at the same time, the user can pivot the top of the computer 10 away from the arm portion 96 to remove the computer 10 from the docking station 14. Alternatively, the user can press down directly on the latching member 132 to move the latching member 132 to the second, retracted position.

Various features and advantages of the invention are set forth in the following claims.

What is claimed is:

1. A computer docking station for supporting a portable computer, the docking station comprising:
    a body having
        a cradle portion configured to support a first portion of the portable computer;
        an arm portion spaced in a first direction away from the cradle portion; and
    a latching member coupled with the body and spaced away from the cradle portion in the first direction, wherein the latching member is positioned relative to the arm portion such that the latching member is operable to cooperate with the arm portion to removably hold the portable computer in the docking station, wherein the latching member is movable relative to the arm portion between a first position, in which the portable computer can be inserted into or removed from the docking station, and a second position, in which the portable computer cannot be removed from the docking station when the portable computer is fully inserted into the docking station,
        wherein the portable computer moves the latching member from the second position to the first position in a second direction toward the cradle portion that is opposite to the first direction as the portable computer is inserted into the docking station and the latching member automatically moves from the first position to the second position in the first direction away from the cradle portion as the portable computer moves past and clears the latching member as the portable computer is fully inserted into the docking station.

2. The computer docking station of claim 1, wherein the latching member includes an activation portion that is accessible to a user to manually move the latching member to the first position.

3. The computer docking station of claim 1, wherein the latching member is pivotally coupled with the body.

4. The computer docking of claim 1, wherein the portable computer has a first side that defines a plane and includes a display and the latching member is positioned relative to the body so that the latching member engages a portion of a surface of the portable computer that is parallel to or in the plane and on the first side of the portable computer when the portable computer is fully inserted into the docking station.

5. The computer docking station of claim 1, wherein the portable computer includes an aperture at least partially defining a carrying handle for the portable computer and the arm portion on the docking station is positioned to be received in the aperture of the portable computer when the portable computer is received in the docking station.

6. The computer docking station of claim 1, wherein the portable computer includes a docking connector and the docking station further comprises a connector on the body operable to electrically couple with the portable computer.

7. The computer docking station of claim 6, wherein the connector is on the cradle portion.

8. The computer docking station of claim 1, wherein the latching member is pivotally coupled with the body and the portable computer includes an aperture at least partially defining a carrying handle for the portable computer, and wherein the arm portion is sized and configured to be received in the aperture of the portable computer when the portable computer is received in the docking station.

9. The computer docking station of claim 8, wherein the portable computer includes a docking connector and the docking station further comprises a connector on the body operable to electrically couple with the portable computer.

10. The computer docking station of claim 1, further comprising a lock mechanism operable to selectively lock the latching member in the second position when the portable computer is fully inserted into the docking station.

11. The computer docking station of claim 1, wherein the arm portion is configured to resiliently deflect with respect to the cradle portion.

12. A computer docking station for supporting a portable computer having a first side that defines a plane and includes a display, the docking station comprising:
    a body having
        a cradle portion configured to support a first portion of the portable computer;
        an arm portion spaced from the cradle portion, wherein the arm portion does not translate with respect to the cradle portion; and
    a latching member coupled with the body, wherein the latching member is positioned relative to the arm portion such that the latching member is operable to cooperate with the arm portion to removably hold the portable computer in the docking station,
        wherein the latching member is movable relative to the arm portion between a first position, in which the portable computer can be inserted into or removed from the docking station, and a second position, in which the portable computer cannot be removed from the docking station when the portable computer is fully inserted into the docking station,
        wherein the portable computer moves the latching member from the second position to the first position as the portable computer is inserted into the docking station and the latching member automatically moves from the first position to the second position as the portable computer moves past and clears the latching member as the portable computer is fully inserted into the docking station,
        wherein the latching member is positioned relative to the body so that when in the second position, the latching member engages a portion of a surface of the portable computer that is parallel to or in the plane and on the first side of the portable computer so that at least a portion of the latching member is exposed to view when the portable computer is fully inserted into the docking station, and wherein the latching member includes an activation portion that is accessible to a user to manually move the latching member to the first position; and a lock mechanism operable to selectively lock the latching member in the second position when the portable computer is fully inserted into the docking station.

13. The computer docking station of claim 12, wherein the latching member is pivotally coupled with the body.

14. The computer docking station of claim 12, wherein the activation portion extends from the latching member.

15. The computer docking station of claim 12, wherein the portable computer includes an aperture at least partially defining a carrying handle for the portable computer and the arm portion on the docking station is positioned to be received in the aperture of the portable computer when the portable computer is received in the docking station.

16. The computer docking station of claim 12, wherein the arm portion is configured to resiliently deflect with respect to the cradle portion.

17. The computer docking station of claim 12, wherein the portable computer includes a docking connector and the docking station further comprises a connector on the body operable to electrically couple with the portable computer.

18. The computer docking station of claim 17, wherein the connector is on the cradle portion.

19. The computer docking station of claim 12, wherein the arm portion is spaced in a first direction away from the cradle portion, the latching member moves from the second position to the first position in a second direction toward the cradle portion that is opposite to the first direction, and the latching member moves from the first position to the second position in the first direction away from the cradle portion.

20. The computer docking station of claim 1, wherein the latching member is pivotally coupled with the body and further comprising a lock mechanism operable to selectively lock the latching member in the second position when the portable computer is fully inserted into the docking station.

* * * * *